Patented Nov. 14, 1944

2,362,669

UNITED STATES PATENT OFFICE 2,362,669

PROCESS FOR THE REMOVAL OF CARBONYL SULPHIDE FROM LOW-BOILING HYDROCARBON FLUIDS

Walter A. Schulze, Bartlesville, Okla., assignor to Phillips Petroleum Company, a corporation of Delaware No Drawing. Application September 23, 1940, Serial No. 358,007

9 Claims. (Cl. 196—30)

This invention relates to a process for removing carbonyl sulphide from hydrocarbon fluids. More specifically, this invention relates to the treatment of hydrocarbons including the so-called normally gaseous hydrocarbons from any source for the selective removal of carbonyl sulphide associated with said hydrocarbons.

Hydrocarbon fluids such as those obtained from crude petroleum oils and other sources usually contain varying amounts of deleterious sulphur compounds as impurities. The kinds and amounts of sulphur compounds occurring in any hydrocarbon fluid vary with the source material and with the method of manufacturing and processing said fluid. For example, thermal cracking operations have a tendency to convert hydrogen sulphide and open-chain sulphur compounds into cyclic compounds and to cause the combination of hydrogen sulphide with carbon compounds to form organic sulphur compounds including carbon sulphides.

Many of the sulphur compounds present in hydrocarbon fluids are detrimental to the processing or marketing of said fluids or of products derivable therefrom. Thus, there are conventional methods for removing hydrogen sulphide from hydrocarbon fluids and for converting mercaptans to less obnoxious form. Further, there are means known to the art for extracting mercaptans as such. However, carbonyl sulphide, a sulphur compound occurring in the lower-boiling products from the thermal processing of hydrocarbon oils does not belong in the classifications mentioned, and being relatively inert is not satisfactorily removed by conventional treating processes employed by the industry for the removal of hydrogen sulphide mercaptans, and the like.

Carbonyl sulphide is presumably formed by reaction of hydrogen sulphide with oxides of carbon under the conditions of heat and pressure and exposed metal surfaces encountered in thermal cracking and reforming operations. The pure compound has a boiling point slightly lower than that of propane, although I have found its apparent boiling point is somewhat higher in hydrocarbon mixtures. Thus, the fractionation of cracking still gases to segregate a propane-butane fraction results in the inclusion of substantially all the carbonyl sulfide present within that fraction. Likewise a butane and heavier fraction containing only minor percentages of propane may contain appreciable amounts of carbonyl sulphide.

The necessity for selectively removing carbonyl sulphide arises when a hydrocarbon fluid, e. g., a C4 fraction from refinery gases, is to be substantially completely desulphurized prior to processing to effect polymerization, alkylation or the like. An object of this invention, then, is to provide a more complete desulphurization of said hydrocarbons after conventional methods for the removal of hydrogen sulphide and mercaptans have been applied.

Carbonyl sulphide is relatively stable toward acidic reagents, and is only slowly affected by strongly alkaline treating reagents such as solutions of caustic soda and the like. The slow reaction with alkaline reagents is apparently based on the hydrolysis of the compound to form hydrogen sulphide which reacts with the alkaline medium. In view of the relatively slow rate of the hydrolysis reaction, incomplete removal of carbonyl sulphide results in a continuous-type treating system wherein the time of intimate contact of hydrocarbon with treating reagent is relatively short. For example, in washing a propane-butane mixture with a solution of caustic soda to remove hydrogen sulphide, I have found that with caustic solutions of normal strength, e. g., 10–20 per cent by weight of sodium hydroxide, only 20–30 per cent of the carbonyl sulphide is hydrolyzed and extracted even when multi-stage contacting is employed.

I have now discovered a method of treatment and a type of reagent which affects the complete removal of carbonyl sulphide from hydrocarbon fluids of the type described. By the conditions of my process, a rapid reaction occurs involving the carbonyl sulphide which is converted to a form insoluble in the hydrocarbon fluid and thus easily and completely removed from the purified fluid. The reagent I prefer to use is a solid contact type reagent composed of an adsorbent carrier impregnated with active chemical ingredients.

I have found that while carbonyl sulphide is rather non-reactive toward acidic as well as strongly alkaline treating solutions, the reaction to form hydrogen sulphide and carbonic acid

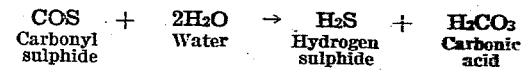

can be promoted by the proper conditions and brought to completion in the presence of the reagents disclosed herein. For this purpose I employ an alkaline solution and/or suspension of a lead salt. The lead salt and the alkaline medium bring about the reaction of both products of the hydrolysis of carbonyl sulphide, forming lead sulphide and a salt of carbonic acid.

I have found that by the use of my solid-type reagent a more complete removal of carbonyl sulphide is obtained than by the use of aqueous solutions of the reagents disclosed herein in the absence of adsorbent carriers. This effect is due in part to the great amount of reagent which is exposed to the hydrocarbon fluid on the surfaces of the adsorbent carriers.

A further advantage of my process of treating with a solid reagent is that I may obtain long contact time of hydrocarbon fluid with reagent and promote complete removal of carbonyl sulphide. Thus, within my preferred range of treating rates of 0.5 to 5 liquid volumes per hour per volume of reagent the contact time ranges from 12 minutes to two hours. This range is in contrast to intimate contact times of ordinarily less than three minutes in processes utilizing aqueous reagent solutions to treat hydrocarbons and is partly responsible for the efficiency of my process.

Since the lead salt solutions described herein will react preferentially with hydrogen sulphide and/or mercaptans, I prefer to operate my process to treat only hydrocarbon fluids substantially free of these types of impurities. My purpose is to avoid an uneconomic spending of the reagents which would prevent complete removal of carbonyl sulphide and add greatly to the operating cost since hydrogen sulphide and mercaptans are ordinarily present in far higher concentrations than carbonyl sulphide and may be removed more economically by processes involving regeneration of the treating solutions. Thus my reagent could react only with those minor traces of hydrogen sulphide and/or mercaptans remaining in the hydrocarbon fluids after treatment by conventional processes.

In addition to the above-named advantages, my method of treating provides true counter-current contact of hydrocarbon fluids with the solid reagent. Thus the reagent is spent in the direction of hydrocarbon flow while the section of the reagent bed adjacent the hydrocarbon exit port is least spent and is most effective for the removal of the lowest concentrations of carbonyl sulphide.

My reagent may be prepared by impregnating fuller's earth or adsorbent clay-type minerals, synthetic aluminas or other adsorbent carriers with a lead salt solution such as sodium plumbite solution prepared by dissolving lead monoxide in a solution of sodium hydroxide of suitable strength. This solution is then sprayed onto the adsorbent carrier. Other means of obtaining the necessary dispersion of the solution on the carrier will be apparent to those skilled in the art. Since lead monoxide has a limited solubility in strong alkali solutions, the weight per cent of lead salt on the reagent may be increased by adding powdered lead monoxide directly to the moist particles of the adsorbent immediately after the initial spraying. In such a case I prefer to use a reagent consisting of about one to three per cent of lead monoxide in solution as sodium plumbite and one to three per cent or more by weight of the dry powdered material. The powder adheres to the dampened particles of the carrier and a satisfactory reagent results.

Sodium plumbite solutions are particularly useful for my process since the desired combination of alkalinity and soluble lead salt is provided. Other lead salts which may be used are those soluble in water or in alkaline solutions for it is highly desirable to have a substantial proportion of the salt in the adsorbed solution at all times during the use of the reagent. When solid lead monoxide is used in combination with plumbite solutions, the solid material may replace the plumbite precipitated by sulphur compounds, or a direct reaction may occur if sufficient contact time is allowed.

Another method of preparing a suitable reagent is to impregnate a carrier material with a solution of a water soluble lead salt such as the acetate and to later add to the impregnated reagent sufficient alkaline solution to convert the lead salt to the hydroxide or other basic salt. The alkaline suspension thus prepared is active in my process when the proper pH range is maintained.

I have found it necessary to maintain an aqueous solution phase on the surface of the adsorbent material throughout the period of use of my reagents. Thus the use of dry salts is not contemplated except in combination with adsorbed solutions as previously described. The pH of the adsorbed solution is maintained above 8 and preferably above 12; this pH range is easily obtained with the strongly alkaline plumbite solutions.

The amount of lead salt to be added in the preparation of my reagents will depend on the solubility of the salt and on the adsorptive capacity of the carrier. In general, weights of lead salt in the range of one to ten per cent of the reagent weight are sufficient and avoid mechanical losses from the surfaces of the adsorbent carrier.

The term lead salts as used herein applies generally to the divalent salts of the metal. Higher lead oxides such as the peroxide and the mixed oxide $Pb_3O_4$ promote the formation of elemental sulphur which is harmful if dissolved in the hydrocarbon stream.

The following examples will serve to illustrate methods of preparing and using satisfactory reagents according to my process. Numerous modifications of the reagent preparations will be obvious from these examples, and therefore are within the scope of my invention.

*Example I*

8–20 mesh Attapulgus clay was impregnated with a soluton of sodium plumbite in sodium hydroxide. The lead salt solution contained about 0.4 pound of lead monoxide per gallon, and was added to the carrier in such a quantity that the reagent contained one per cent by weight of sodium plumbite.

Liquid butane which had been treated to remove hydrogen sulphide and mercaptans was filtered over the reagent at ordinary temperature and at flow rates of about two volumes per hour per volume of reagent. The butane before treatment contained 0.003 weight per cent of carbonyl sulphide while the treated butane was free of the impurity.

*Example II*

8–20 mesh Attapulgus clay was impregnated according to the procedure of Example I with one per cent by weight of sodium plumbite. To the still damp reagent was added an additional two per cent by weight of dry powdered lead monoxide. The powdered material adhered tightly to the clay particles to give a satisfactory reagent of higher lead salt content.

A liquid propane-butane mixture which had been previously treated for the removal of hydrogen sulphide and mercaptans was passed over this reagent at a flow rate of two volumes per hour per volume of reagent. The butane contained 0.005 per cent by weight of carbonyl sulphide before treatment, and less than 0.0001 per cent after treatment.

Example III

8–20 mesh fuller's earth was impregnated with three per cent by weight of lead acetate in aqueous solution. Following this treatment a dilute solution of sodium hydroxide was applied in a quantity sufficient to convert the lead salt to the hydroxide. The pH of the adsorbed aqueous phase was above 10.

A liquid propane fraction which had received treatment for the removal of hydrogen sulphide was passed over the reagent at a flow rate of one volume of propane per hour per volume of reagent. The propane contained 0.005 per cent by weight of carbonyl sulphide before treatment, and less than 0.0001 per cent after treatment.

My process is conveniently carried out at ordinary atmospheric temperatures between 30° and 110° F. although slightly higher temperatures may be used if desired.

Pressures in my process are usually low superatmospheric pressures between 50 and 500 pounds gauge. Operating pressures may depend upon the hydrocarbon being treated. Thus when treating butane or propane in liquid phase sufficient pressure is used to avoid vaporization.

It is usually desirable to treat in liquid phase, since the volume of reagent required for nominal flow rates of from 0.2 to 5 volumes per hour per volume of reagent is not excessive. However, treating the normally gaseous hydrocarbons in vapor phase is satisfactory if provision is made in the size of the reagent bed to allow contact times corresponding to linear vapor velocities less than five feet per minute.

I claim:

1. The process for the removal of carbonyl sulphide from low-boiling hydrocarbon fluids which comprises passing said fluids subsequent to treatment for the removal of hydrogen sulphide and mercaptans in contact with a reagent comprising an adsorbent carrier impregnated with sodium plumbite solution.

2. The process for the removal of carbonyl sulphide from low-boiling hydrocarbon fluids which comprises passing said fluid subsequent to treatment for the removal of hydrogen sulphide and mercaptans in contact with a reagent comprising an adsorbent carrier impregnated with lead monoxide and a solution of sodium plumbite.

3. The process for the removal of carbonyl sulphide from low-boiling hydrocarbon fluids which comprises passing said fluids subsequent to treatment for the removal of hydrogen sulphide and mercaptans in contact with lead acetate in aqueous solution subsequently converted to the hydroxide.

4. A process for the removal of carbonyl sulphide from low-boiling hydrocarbon fluids previously treated for the removal of hydrogen sulphide and mercaptans which comprises passing said fluids in contact with a reagent comprising an adsorbent carrier impregnated with an aqueous, alkaline solution of a bivalent lead salt reactive with hydrogen sulphide to form lead sulphide.

5. A process for the removal of carbonyl sulphide from low-boiling hydrocarbon fluids previously treated for the removal of hydrogen sulphide and mercaptans which comprises passing said fluids in contact with a reagent comprising an adsorbent carrier impregnated with a bivalent lead salt in an aqueous, alkaline suspension, said alkaline suspension being reactive with hydrogen sulphide to form lead sulphide.

6. In a process for desulphurizing low-boiling hydrocarbon fluids at ordinary temperatures which comprises treating said fluids in successive stages for the removal of hydrogen sulphide, mercaptans and other sulphur compounds, the step which comprises passing said fluids subsequent to the removal of the hydrogen sulphide and mercaptans therefrom in contact with a reagent comprising an adsorbent carrier impregnated with an aqueous, alkaline solution of a bivalent lead salt reactive with hydrogen sulphide to form lead sulphide.

7. In a process for desulphurizing low-boiling hydrocarbon fluids at ordinary temperatures which comprises treating said fluids in successive stages for the removal of hydrogen sulphide, mercaptans and other sulphur compounds, the step which comprises passing said fluids subsequent to the removal of the hydrogen sulphide and mercaptans therefrom in contact with a reagent comprising an adsorbent carrier bearing an aqueous, alkaline solution and suspension of divalent lead salts reactive with hydrogen sulphide to form lead sulphide.

8. A process for the removal of carbonyl sulphide from hydrocarbon fluids containing the same and essentially free from hydrogen sulphide and mercaptans which comprises contacting said fluids with a reagent comprising an adsorbent carrier impregnated with a bivalent lead salt reactive with hydrogen sulphide to form lead sulphide, and an aqueous medium, the pH of said aqueous medium having a value greater than about 8.

9. A process for the removal of carbonyl sulphide from low-boiling hydrocarbon fluids containing the same and substantially free of hydrogen sulphide and mercaptans which comprises contacting said fluids in liquid phase with a reagent comprising an adsorbent carrier impregnated with a bivalent lead salt reactive with hydrogen sulphide to form lead sulphide, and an aqueous, alkaline medium with a contact time ranging from about 12 minutes to about 2 hours and at temperatures in the range of approximately 30° to 110° F.

WALTER A. SCHULZE.